United States Patent [19]

Wlezien

[11] Patent Number: 5,491,307
[45] Date of Patent: Feb. 13, 1996

[54] POROUS SINGLE EXPANSION RAMP

[75] Inventor: Richard W. Wlezien, Darien, Ill.

[73] Assignee: McDonnell Douglas Corporation, Huntington Beach, Calif.

[21] Appl. No.: 592,998

[22] Filed: Oct. 5, 1990

[51] Int. Cl.[6] ........................................................ F02K 1/00
[52] U.S. Cl. ............................................................. 181/213
[58] Field of Search ...................................... 181/213, 215, 181/216, 218, 222, 210, 211, 217, 292

[56] References Cited

U.S. PATENT DOCUMENTS

| | | | |
|---|---|---|---|
| 2,926,744 | 3/1960 | Towle et al. | 181/213 |
| 2,959,917 | 11/1960 | McGehee | 181/213 |
| 3,437,173 | 4/1969 | Ehrich | 181/213 |
| 3,648,800 | 3/1972 | Hoerst | 181/210 |
| 3,665,007 | 4/1972 | Hilbig | 181/213 |
| 3,819,007 | 6/1974 | Wirt et al. | 181/213 |
| 3,821,999 | 7/1974 | Guess et al. | 181/292 |
| 3,964,568 | 6/1976 | Neumann | 181/217 |
| 4,231,447 | 11/1980 | Chapman | 181/213 |

OTHER PUBLICATIONS

SAE Journal, Aug. 1959, pp. 82–84.

Primary Examiner—Khanh Dang
Attorney, Agent, or Firm—Donald E. Stout; Roger C. Turner; Ronald L. Taylor

[57] ABSTRACT

Single expansion ramp to extend from the exhaust opening of a fluid nozzle. A surface of the ramp lying adjacent to fluid flow exhausting the nozzle is porous. The ramp of the present invention reduces the shock wave noise resulting from supersonic flow exhausting the nozzle by causing the formation of weak compression waves in the exhaust plume, which in turn weaken the strength of the standing shock waves in the plume.

4 Claims, 5 Drawing Sheets

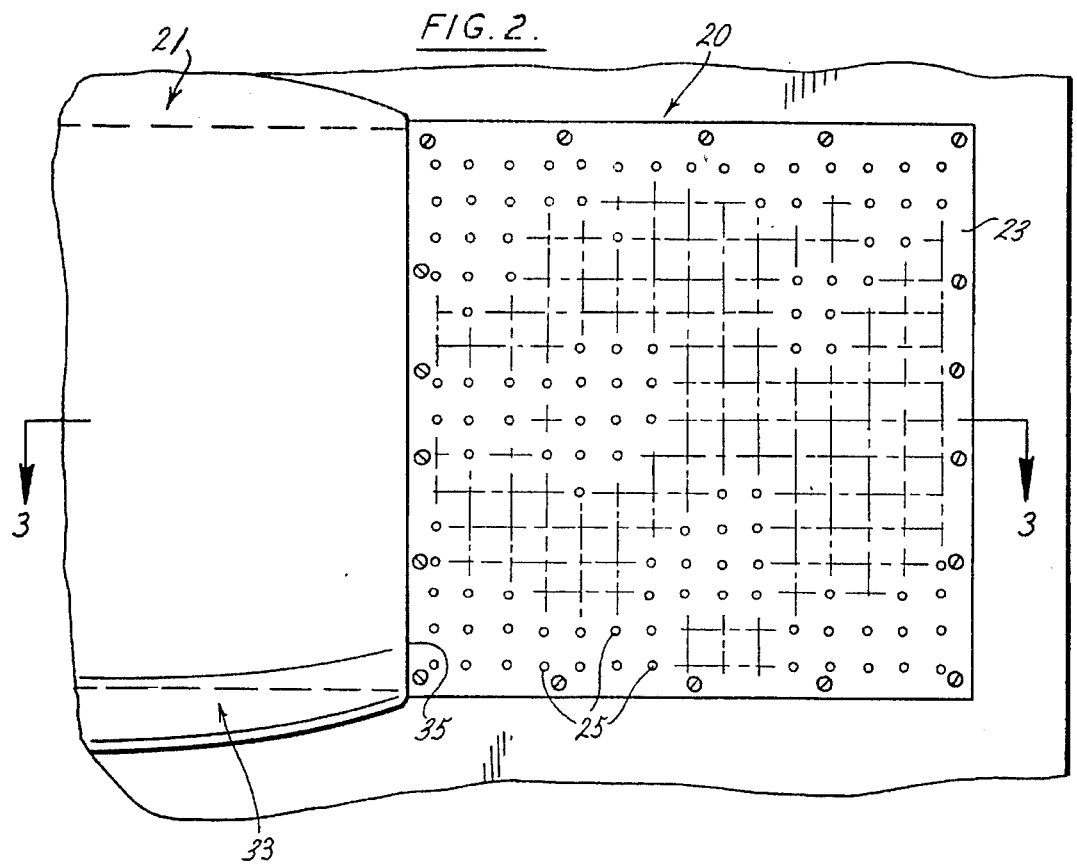
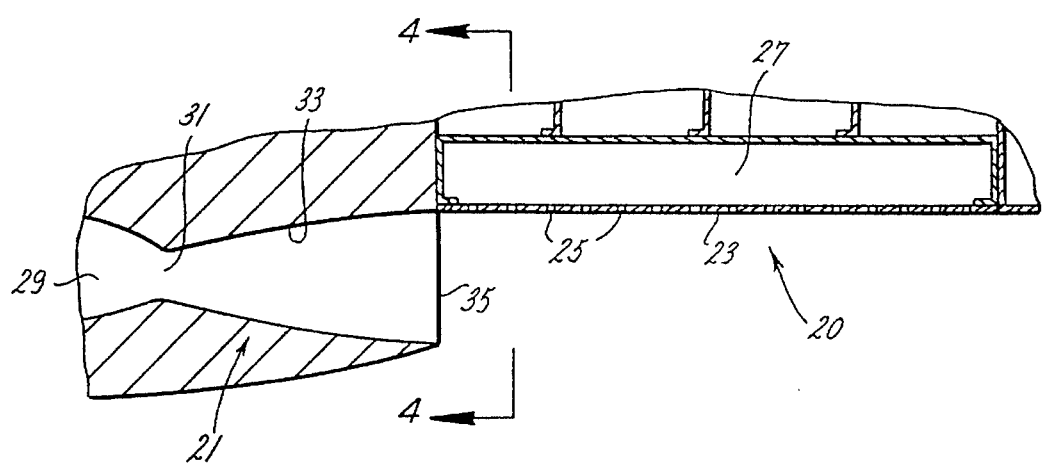

POROUS SINGLE EXPANSION RAMP

BACKGROUND OF THE INVENTION

1. Field of Invention

The invention is a ramp for reducing the noise generated by the supersonic flow exhausting from a nozzle and, more particularly, includes a single expansion ramp having a porous surface for attachment to the exhaust opening of a fluid nozzle.

2. Description of the Prior Art

A series of shock waves are created by the exhaust gases of a jet engine when those gases reach supersonic velocity downstream of the choke plane of the exhaust nozzle. For an aircraft being propelled by several jet engines, shock waves are created by each jet engine even when the aircraft is travelling at subsonic speeds, for example, when the aircraft is taking off or landing. This poses a problem because take-offs and landings are frequently from airports located quite close to residential areas and thus disturb the residents and are a source of constant friction between the airlines and such residents. The nuisance created by shock wave noise from jet exhausts has caused alteration of take-off and landing patterns at many airports in order to meet federal regulations and, in some cases, even stricter local noise abatement ordinances.

It is also desirable to reduce shock wave noise from jet exhausts in order to lessen the deleterious effect such noise has on the structural integrity of the aft section of an aircraft.

There are two major components to shock wave noise: screech and a broadband component. Both components are identified in FIG. 1, which is a graph of sound pressure level versus frequency for the noise generated by the exhaust of a jet engine. Screech is characterized by the high amplitude spike at a frequency lower than the broadband component. The broadband component extends over a broader range of frequencies and at a lower sound pressure level than screech.

Screech is a resonant feedback instability in a supersonic plume containing shock cells. An acoustic wave travelling upstream outside the plume excites the shear layer at the nozzle lip. A shear layer instability wave then convects downstream and interacts with the standing shock waves in the plume, causing the plume to oscillate from side to side and creating the sound waves comprising the screech component. In subsonic flight, the screech sound waves travel upstream to the nozzle lip, where they excite another shear layer instability wave. The frequency at which the screech component occurs is the resonant frequency for the aforementioned feedback loop.

It is known in the prior art that the screech component can be eliminated by extending a ramp having a non-porous surface from the nozzle exhaust opening to stabilize the plume and prevent it from oscillating.

The broadband component is created by turbulent vortices passing through the standing shock waves in the plume. There is no feedback and thus there is no single resonant frequency. That is why the frequency band of this source of shock wave noise is much broader than the screech component. However, as this component does not rely on feedback from downstream fluid flow, it is not reduced by placing a non-porous ramp extension on the nozzle exhaust opening.

The prior art also reduces shock wave noise by using a number of small nozzles in place of each large nozzle. This results in shifting the broadband component to a higher frequency range, where it is easier to absorb with conventional sound absorption materials.

The drawback to this approach is that the added number of nozzles requires more material and associated hardware, and thus adds weight to the propulsion system. Additionally, using a number of smaller nozzles results in a total inner surface area facing the exhaust flow which is greater than the comparable inner surface area for a single nozzle, and thus results in greater skin friction drag, which lowers the velocity of the exhaust gases and concomitantly reduces the thrust of the jet engine. Furthermore, using a plurality of smaller nozzles creates low pressure areas between them, which lowers the base pressure and thus increases the base pressure drag of the aircraft. This solution thus sacrifices performance to reduce shock wave noise.

Shock wave noise has also been reduced by weakening the shock waves emanating from the exhaust nozzle by using a nozzle having a variable configuration. The shock waves are weakened when the design parameters of the nozzle approximate the exhaust flow parameters. The configuration of the variable configuration nozzle is changed during flight depending on the flight conditions so that the design point of the nozzle becomes closer to the current parameters of the exhaust flow. However, variable configuration nozzles have inherent drawbacks in that they weigh more than a nozzle having a fixed configuration, are mechanically complex, and must be continually inspected and maintained to ensure proper operation.

SUMMARY OF THE INVENTION

The present invention is a single expansion ramp for attachment to the exhaust opening of a fluid nozzle. The ramp has a porous surface which faces the flow of gases exhausting from the nozzle. The porous surface of the ramp weakens the shock waves generated by the supersonic exhaust gases by creating weak compression waves in the exhaust plume. As the amplitude of the broadband noise component is proportional to the strength of the standing shock waves in the exhaust plume, the present invention thereby reduces the amplitude of this component.

The ramp of the present invention reduces the broadband noise component without employing a plurality of smaller nozzles and conventional noise absorption materials, and thus does not incur the decreased thrust and increased weight and drag attendant to their use. Further, the ramp of the present invention will reduce shock wave noise regardless of whether the parameters of the exhaust flow approximate the design point of the nozzle. It is a passive device which will add a negligible amount of weight to the nozzle, has no moving parts, and will not require constant inspection and maintenance to ensure proper operation.

BRIEF DESCRIPTION OF THE DRAWINGS

FIG. 2 is a plan view of the porous bottom of the ramp of the present invention. The ramp is attached to the exhaust opening of a convergent-divergent nozzle.

FIG. 3 is a cross-sectional view of the porous ramp of the present invention attached to a convergent-divergent nozzle, taken along line 3—3 of FIG. 2.

DETAILED DESCRIPTION OF A PREFERRED EMBODIMENT

Figure 1:
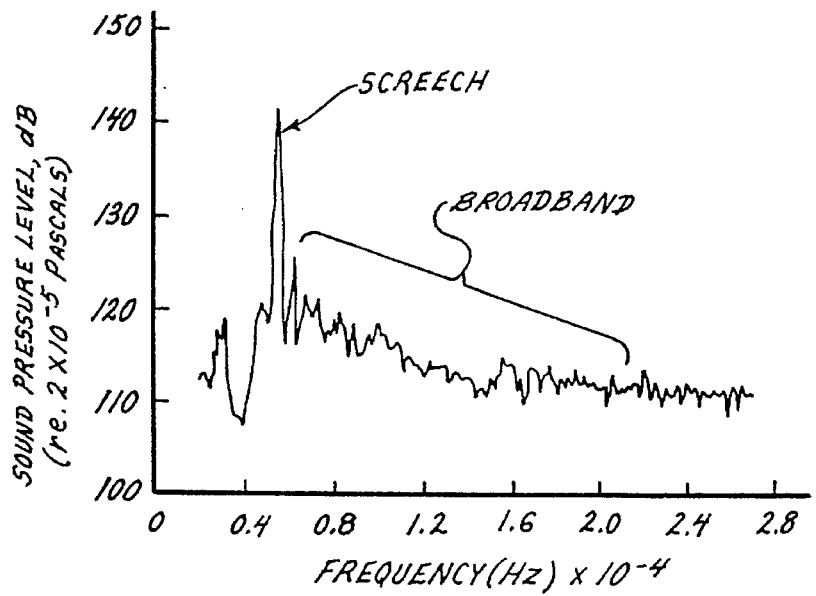
FIG. 1 is a graph of the sound pressure level versus the frequency of shock wave noise generated by the exhaust gases of a jet engine. The screech and broadband components are designated.

Ramp 20 is a preferred embodiment of the present invention and is shown attached to convergent-divergent nozzle 21. Nozzle 21 is the exhaust nozzle for a jet engine (not shown).

Ramp 20 is comprised of surface 23, holes 25 in surface 23, and ramp plenum 27. Holes 25 are cylindrical with the same diameter and are uniformly spaced apart from each other. Nozzle 21 is comprised of nozzle plenum 29, choke plane 31, expansion structure 33, and exhaust opening 35.

Figure 4:
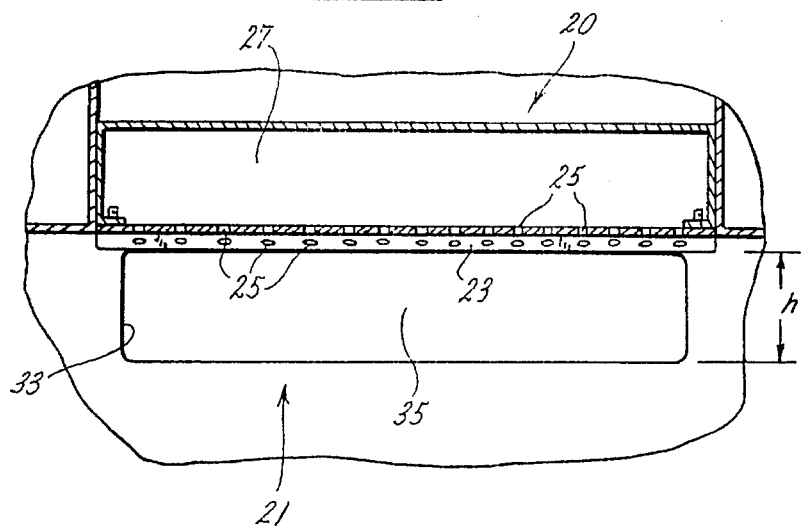
FIG. 4 is a cross-sectional view of the porous ramp of the present invention taken along line 4—4 of FIG. 3. The ramp is attached to the top of the rectangular exhaust opening of a convergent-divergent nozzle.

FIG. 2 shows a plan view of surface 23 of ramp 20 and nozzle 21, while FIG. 3 is a cross-sectional view of ramp 20 and nozzle 21 taken along line 3—3 of FIG. 2. As is best shown in FIG. 4, a cross-sectional view of ramp 20 and nozzle 21 taken along line 4—4 of FIG. 3, exhaust opening 35 is rectangular with a height of h. Choke plane 31 and expansion structure 33 have lateral cross-sections which are also rectangular.

Surface 23 is planar. However, this surface of the ramp of the present invention may be curved to suit other applications, and such embodiments are also within the scope of the present invention.

Ramp 20 is attached to nozzle 21 along the top edge of exhaust opening 35 so that surface 23 is co-planar with the top edge of exhaust opening 35 where they meet. During operation of the jet engine, gas composed of the products of combustion of the jet engine flows at high speed through nozzle 21 and exits through exhaust opening 35. Since the static pressure for the gas flowing through exhaust opening 35 is greater than the ambient static pressure, the gas flow expands upon passing through exhaust opening 35 and forms exhaust plume 36.

Figure 5:
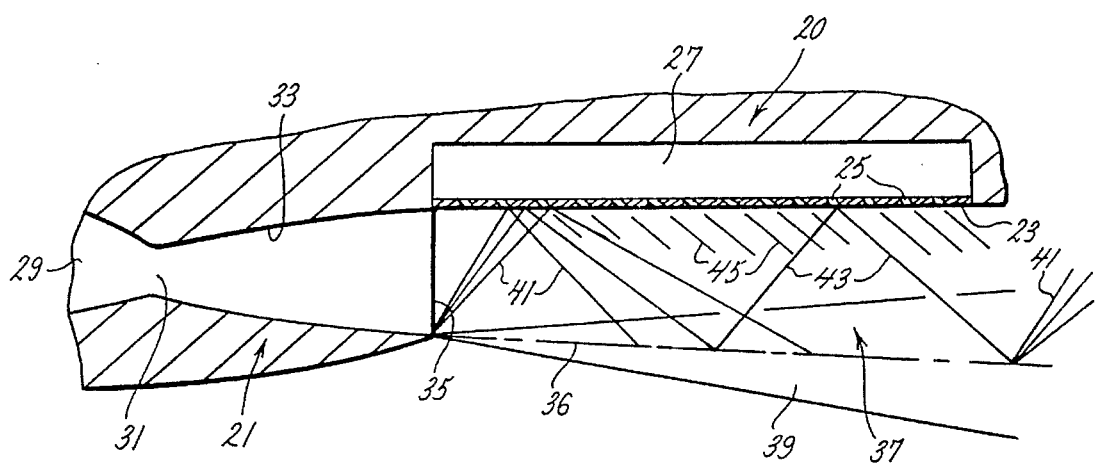
FIG. 5 is a longitudinal cross-sectional view of the porous ramp of the present invention attached to a convergent-divergent nozzle. This figure shows the shock, compression, and expansion waves and the shear layer that occur when fluid exhausts the nozzle at supersonic velocity.

As illustrated in FIG. 5, standing shock pattern 37 is formed in exhaust plume 36 by the expansion of the exhaust gas flow and the subsequent multiple reflections of the shock waves off of surface 23 and shear layer 39, a turbulent zone created by the differences in velocities between the supersonic flow in exhaust plume 36 and the ambient atmosphere. Standing shock pattern 37 is composed of expansion waves 41, shock waves 43, and compression waves 45.

Figure 6:
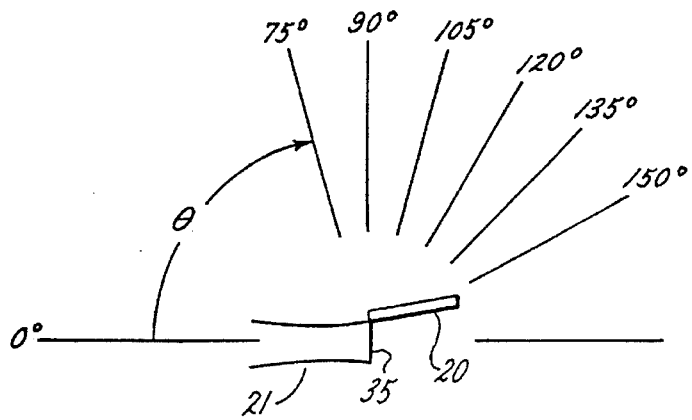
FIGS. 6 and 7 define the coordinate system used to identify the locations of microphones employed to test the effectiveness of the ramp of the present invention in reducing shock wave noise.
Figure 7:
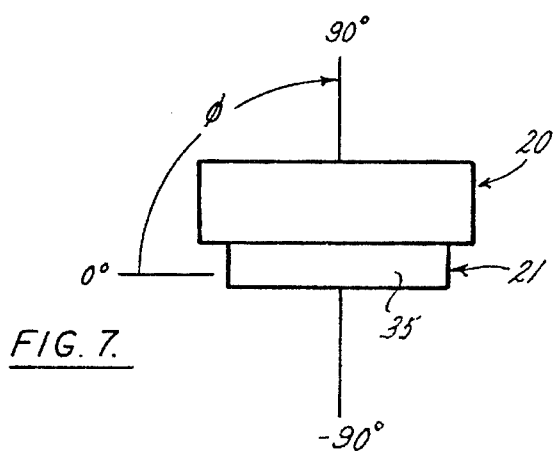

The effectiveness of the present invention was tested using microphones stationed at various locations to compare the sound level generated by gases exhausting from nozzle 21, both with and without ramp 20 being attached. FIGS. 6 and 7 define the coordinate system used to identify the locations of the microphones used in the tests. The origin of the coordinate system is on the centerline of nozzle 21 in the plane of exhaust opening 35. The polar angle $\Theta$ shown in FIG. 6 is taken in the vertical plane which includes the centerline of nozzle 21. The azimuth angle $\Phi$ shown in FIG. 7 is taken in the plane of exhaust opening 35.

All of the microphones were positioned at a radius of forty-eight hydraulic diameters from the origin. A hydraulic diameter for a nozzle having a rectangular exhaust opening, such as exhaust opening 35 of nozzle 21, is the diameter of a nozzle with a circular exhaust opening having the same cross-sectional area as the rectangular exhaust opening. A radius of more than ten hydraulic diameters is considered to be in the acoustic far field of the nozzle exhaust opening and exhaust plume.

Figure 8:
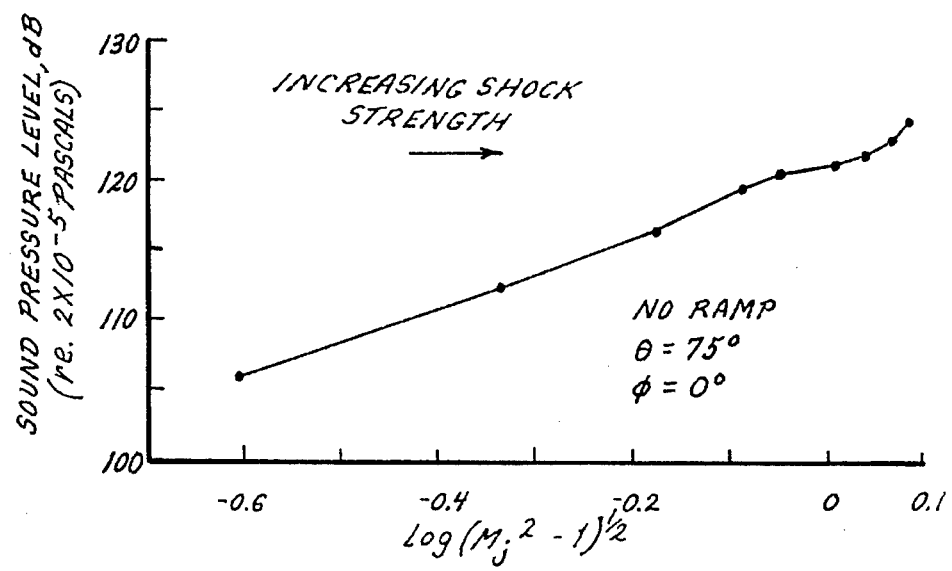
FIG. 8 is a graph of shock wave noise versus a jet Mach number parameter, $\log (Mj^2-1)^{1/2}$, emitted by a convergent-divergent nozzle without a single expansion ramp.

The broadband shock wave noise component shown in FIG. 1 is caused by eddies passing through standing shock waves in a nozzle exhaust plume, similar to shock waves 43 shown in exhaust plume 36. FIG. 8 plots overall sound pressure versus a jet Mach number parameter, $\log (Mj^2-1)^{1/2}$ where Mj is the ideally expanded Mach number of an exhaust plume. The data displayed in FIG. 8 was taken for nozzle 21 without a ramp at $\Theta=75°$ and $\Phi=0°$. The graph shows that the sound generated by fluid passing through a standing shock wave in a plume increases as the strength of the shock wave increases. Conversely, decreasing the strength of the shock wave reduces the noise it generates.

The present invention reduces the noise generated by fluid flowing through a supersonic nozzle by eliminating screech and reducing the amplitude of the broadband component. Screech is eliminated by adding a single expansion ramp, as previously explained in the description of the prior art. The present invention reduces the heretofore intractable broadband component by weakening the strength of the standing shock waves in the exhaust plume. As particularly shown in FIG. 5, supersonic flow over holes 25 causes formation of weak compression waves 45 and thereby avoids the more sudden flow compression which would cause shock waves 43 to be stronger. The amplitude of the broadband noise component is reduced along with the strength of shock waves 43.

The eddies passing through weak compression waves 45 cause a broadband noise component having a lower amplitude than that which would be created by eddies passing through a shock wave and also shifts the broadband frequency to a higher range which does not propagate through the ambient atmosphere efficiently as a broadband component having a lower frequency range.

Figure 9:
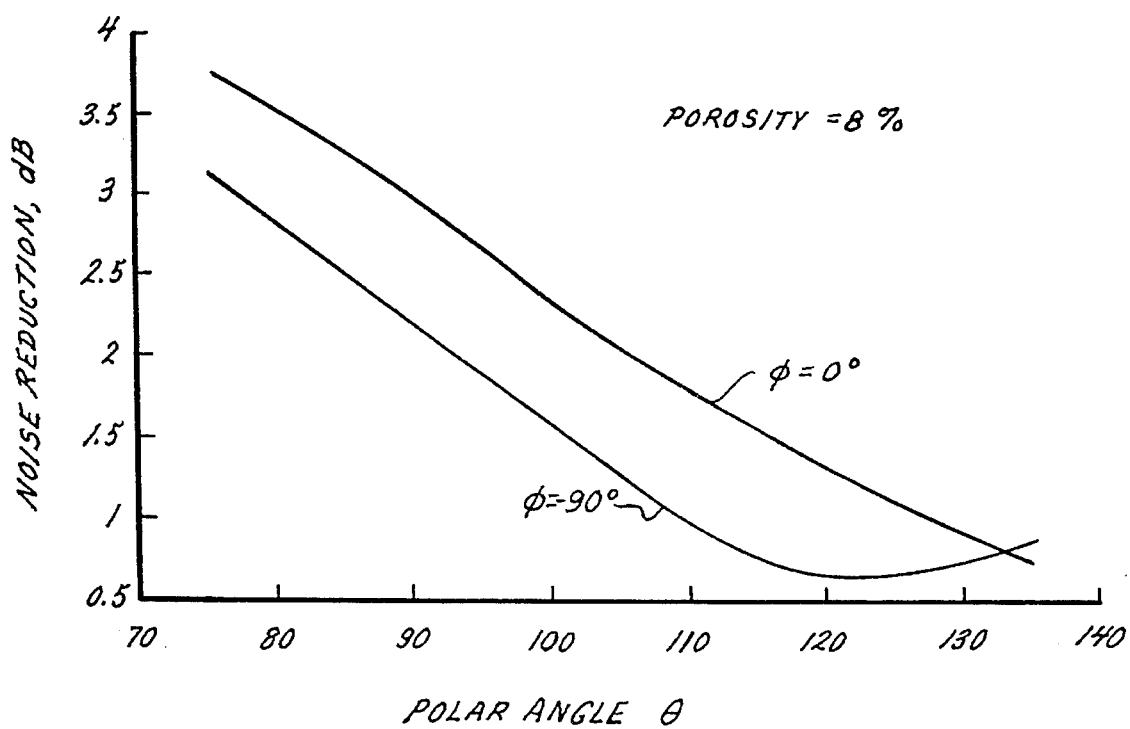
FIG. 9 is a graph showing the reduction in shock wave noise obtained by a convergent-divergent nozzle using the porous ramp of the present invention in comparison to the same nozzle using a nonporous ramp. The noise reduction was plotted versus the angle $\Theta$ for two azimuth angles, $\phi=0°$ and $\phi=-90°$. The porosity of the ramp of the present invention is 8%.

FIG. 9 is a graph of experimental data showing the noise reduction for nozzle 21 with ramp 20 in comparison to nozzle 21 with a nonporous ramp. The polar angle $\Theta$ is varied from 75° to 135° for each of two azimuth angles, $\Phi=-90°$ (the under airplane position) and $\Phi=0°$ (the sideline position). The porosity of ramp 20 is 8%, where porosity is defined as the combined areas of holes 25 taken across surface 23, divided by the area of surface 23. As shown in FIG. 9, the greatest noise reduction is found at $\Theta=75°$ for both $\Phi=0°$ and $\Phi=-90°$.

Figure 10:
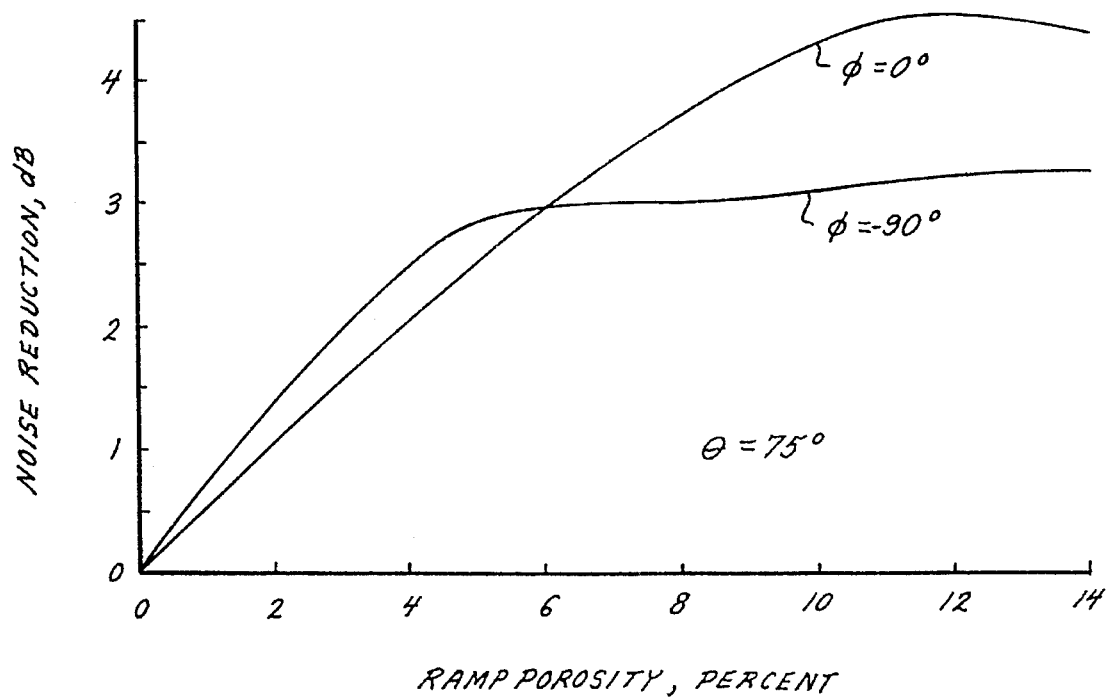
FIG. 10 is a graph of the reduction in shock wave noise obtained by a convergent-divergent nozzle using the porous ramp of the present invention versus the porosity of the ramp. Data is plotted for $\phi=0°$ and $\phi=-90°$, with $\Theta$ equal to 75°.

A further series of tests were conducted in order to determine the relationship between noise reduction and the porosity of surface 23 of ramp 20. The tests were conducted with $\Theta$ kept constant at 75° because shock wave noise is generally dominant over other noise components in the forward quadrant. A graph of the data obtained from the foregoing tests comprises FIG. 10.

For $\Phi=-90°$ the shock wave noise is reduced by almost three decibels at a porosity of 4% with further increases in porosity resulting in only slight increases in noise reduction. For $\Phi=0°$, the noise reduction peaks at close to 4.5 decibels for a porosity of 11%. The tests thus indicate that a porosity of 8% to 11% would maximize noise reduction for both $\Phi=-90°$ and $\Phi=0°$.

The distance separating where standing expansion waves 41 and following shock waves 43 impinge on surface 23 increases with h as well as the Mach number. Qualitatively speaking, ramp 20 will generate weak compression waves 45 that are necessary to reduce shock wave noise only when the diameter of holes 25 are small relative to the aforementioned separation distance. The separation distance is a function of Mach number and h. Thus, where the Mach number remains constant, noise reduction will be a function of hole diameter and h.

Figure 11:
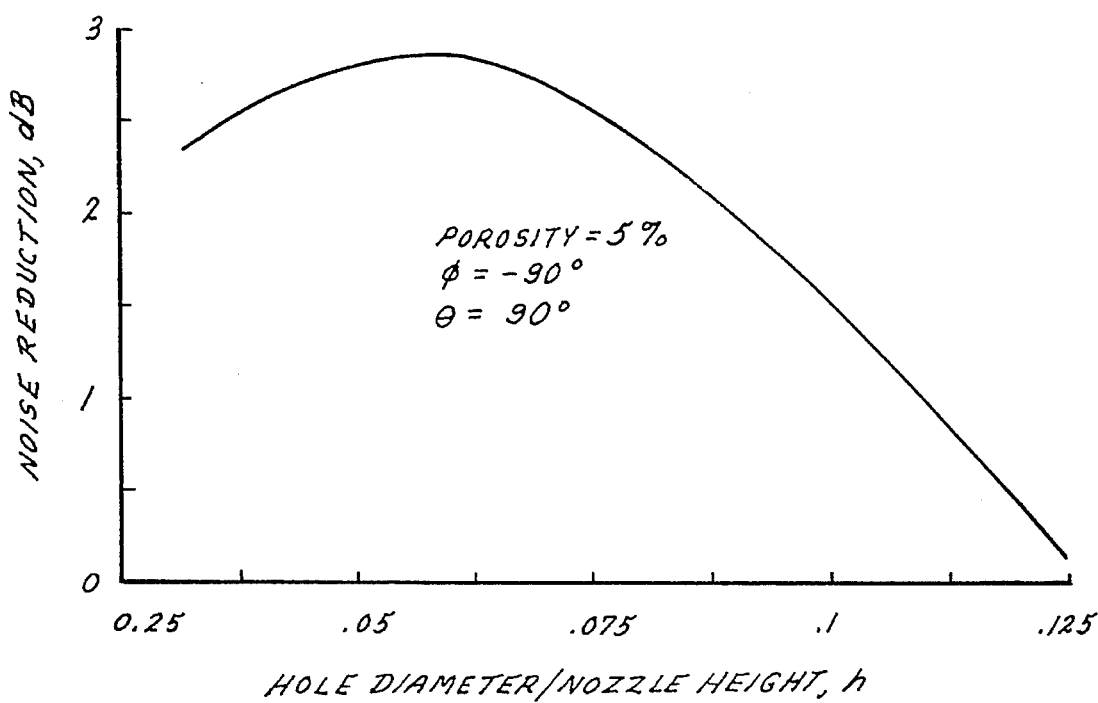
FIG. 11 is a graph of the reduction in shock wave noise obtained by a convergent-divergent nozzle using the porous ramp of the present invention in comparison to the same nozzle using a nonporous ramp, versus the ratio of the diameter of the holes in the ramp to the height of the rectangular exhaust opening of the nozzle. The ramp porosity is 5%. $\Theta$ is equal to 90°. $\phi$ is equal to –90°.

The relationship between shock wave noise reduction and the ratio of hole diameter to h is shown by the graph of experimental data comprising FIG. 11. The data was taken with $\Theta=90°$, $\Phi=-90°$ and a porosity of 5%. The graph clearly shows that the effectiveness of the invention decreases as the diameter of holes 25 increases relative to h, with the noise reduction becoming negligible where the ratio of hole diameter to h equals or exceeds 0.125.

Although holes 25 fluidly communicate with ramp plenum 27 in the preferred embodiment of the present invention, tests indicate that the ramp of the present invention will reduce shockwave noise by approximately the same amount where the ramp does not enclose a plenum, and the ramp holes instead fluidly communicate with the ambient atmosphere on the side of the ramp facing away from the exhaust plume.

Although the utility of the present invention was confirmed by tests using a preferred embodiment having uniformly spaced cylindrical holes 25, the invention will also cause the formation of the essential compression waves in the nozzle exhaust plume where the porous openings in ramp surface 23 are not cylindrical, as well as where the porous openings are not uniformly spaced apart from each other. Such variations are expressly included within the scope of the present invention.

Ramp 20 of the present invention is shown attached to convergent-divergent nozzle 21, and its effectiveness is demonstrated by data obtained in experimental tests conducted using the foregoing nozzle. However, the invention can also be used to similarly reduce the shock wave noise emanating from a convergent nozzle or from any nozzle capable of causing subsonic flow to exhaust the nozzle as supersonic flow.

Further, although one beneficial use is to reduce the shock wave noise emanating from the jet engines on airplanes, the ramp of the present invention could also be used on a nozzle having flow passing therethrough caused by virtually any source of high pressure, for example, a nozzle attached to a hose fluidly communicating with a tank containing pressurized fluid. Such use could reduce the shock wave noise accompanying the application of pressurized fluids in a variety of industrial situations where workers are often exposed to decibel levels emanating from such nozzles that could deleteriously affect their hearing.

Changes and modifications within the specifically described embodiment can be carried out without departing from the scope of the invention, which is intended to be limited only by the scope of the appended claims.

What is claimed is:

1. In a nozzle of the type capable of exhausting supersonic fluid flow which forms standing shock waves generating noise having an amplitude, and having a ramp extending therefrom, the improvement comprising:

said ramp having a face lying adjacent the supersonic fluid flow;

holes which pass through said face and entirely through said ramp; and said face having a porosity of at least four percent, whereby compression waves are created in the supersonic fluid flow and the amplitude of the noise is decreased.

2. In a nozzle of the type capable of exhausting supersonic fluid flow which forms standing shock waves generating noise having an amplitude, and having a ramp extending therefrom, the improvement comprising:

said ramp having holes therethrough;

said holes being substantially cylindrical;

each of said holes having a diameter which is approximately the same for all of said holes;

the nozzle having an exhaust opening which is substantially rectangular and has a height h; and said diameter divided by said height h being less than 0.125, whereby the amplitude of the noise is decreased.

3. A ramp for reducing noise generated by a supersonic fluid flow exhausted by a nozzle comprising:

said ramp being attached to the nozzle and having a face lying adjacent to the supersonic fluid flow;

holes passing through said face and entirely through said ramp; and said face having a porosity of at least four percent, whereby standing shock waves formed in the supersonic fluid flow are weakened and the noise generated by the supersonic fluid flow is decreased.

4. A ramp for reducing noise generated by a supersonic fluid flow exhausted by a nozzle comprising:

said ramp being attached to the nozzle;

holes passing through said ramp;

said holes being substantially cylindrical;

each of said holes having a diameter which is approximately the same for all of said holes;

the nozzle having an exhaust opening which is substantially rectangular and has a height h; and said diameter divided by said height h being less than 0.125.

* * * * *